United States Patent [19]
Williams

[11] 3,754,775
[45] Aug. 28, 1973

[54] BELT ARRANGEMENT
[75] Inventor: Alverson B. Williams, Warren, Mich.
[73] Assignee: General Motors Corporation, Detroit, Mich.
[22] Filed: Apr. 26, 1972
[21] Appl. No.: 247,565

[52] U.S. Cl. .......................................... 280/150 SB
[51] Int. Cl. ............................................ B60r 21/10
[58] Field of Search .............. 280/150 SB; 297/388, 297/389

[56] References Cited
UNITED STATES PATENTS
| | | | |
|---|---|---|---|
| 2,864,437 | 12/1958 | Spring | 280/150 SB |
| 3,348,881 | 10/1967 | Weman | 280/150 SB |
| 3,236,540 | 2/1966 | Berton | 280/150 SB |

FOREIGN PATENTS OR APPLICATIONS
| | | | |
|---|---|---|---|
| 870,423 | 6/1961 | Great Britain | 280/150 SB |

Primary Examiner—Benjamin Hersh
Assistant Examiner—Robert R. Song
Attorney—W. E. Finken and Herbert Furman

[57] ABSTRACT

A belt arrangement for restraining an occupant of a vehicle body in seated position includes a belt with one end received by an inertia responsive retractor mounted on the vehicle body adjacent an upper outboard portion of the seat back of the seat. The other end of the belt attaches a first D-ring, while an adjustable attachment secures a second D-ring to an intermediate portion of the belt. The D-rings are respectively received by a pair of buckles located at opposite sides of the seat cushion of the seat to allow use of the belt as a combination lap and shoulder belt and are received by the buckles in an opposite manner to allow use of the belt only as a lap belt. An attachment on the belt between the second D-ring and the retractor allows attachment of the first D-ring while the second D-ring remains secured to the outboard buckle to provide a storage position for the belt arrangement.

4 Claims, 4 Drawing Figures

Patented Aug. 28, 1973   3,754,775

BELT ARRANGEMENT

BACKGROUND OF THE INVENTION

This invention relates generally to belt arrangements for restraining vehicle body occupants in seated position.

It is well known to provide a strap or belt arrangement for restraining a vehicle body occupant in a seated position. The belt arrangement may include a lap belt passed laterally over the occupant's lap to restrain the lower torso portion of the occupant and may additionally include a shoulder belt passed diagonally across the occupant's chest to restrain the upper torso portion of the occupant. The lower end of the shoulder belt may be held in occupant restraining position by a suitable detachable securement positioned on the vehicle body generally adjacent the position where the vehicle body detachably secures the adjacent end of the lap belt. The lower end of the shoulder belt may also be fixedly secured to the adjacent end of the lap belt such that both of these belt ends may be secured by a single attachment or buckle. Heretofore with this latter type of arrangement, it has not been possible to use the lap belt without the shoulder belt due to the fixed securement of the ends of these belts to each other.

SUMMARY OF THE INVENTION

One feature of this invention is that it provides a belt arrangement including a single length of belt positionable as a combination lap and shoulder belt or as only a lap belt. Another feature of the invention is that this alternate belt use is provided by first and second D-rings respectively secured to one end of the belt and to an intermediate portion thereof such that these D-rings may be alternately secured by first and second buckles positioned on opposite sides of the seat adjacent the seat cushion. Another feature of the invention is that the upper end of the shoulder belt of this belt arrangement may be received by an inertia responsive belt retractor such that an occupant using the belt arrangement as a combination lap and shoulder belt is allowed upper torso movement at a controlled rate and thus has access to the vehicle controls. Another feature of the invention is that the shoulder belt may include an attachment for securing the first D-ring while the second D-ring remains buckled such that the belt arrangement can be moved from the lap belt restraining position to a storage position with a minimum of effort.

BRIEF DESCRIPTION OF THE DRAWINGS:

An understanding of the present invention is readily apparent from the following description of the preferred embodiment and the drawings in which.

Figure 1:
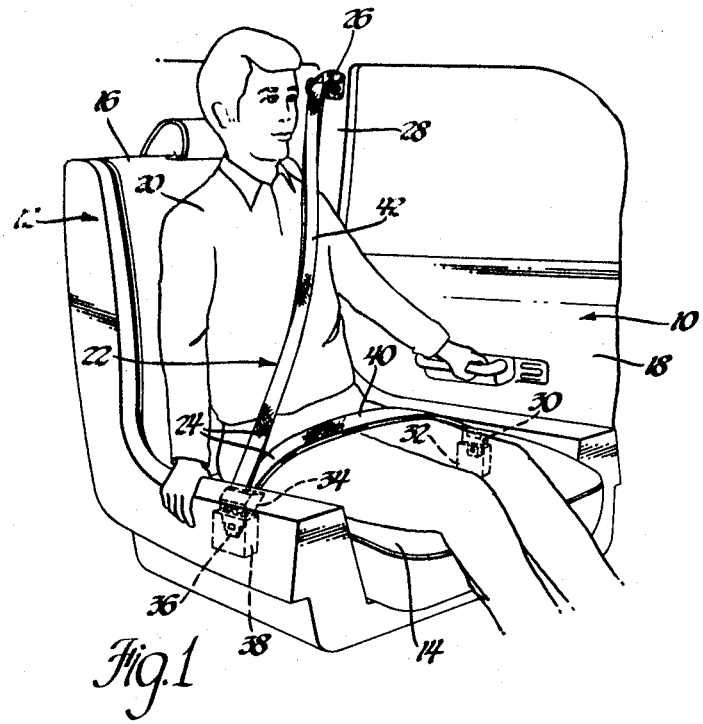
FIG. 1 is a perspective view of the interior portion of a vehicle body whose seated occupant is shown restrained by a belt arrangement, according to this invention, which is being used as a combination lap and shoulder belt.

DESCRIPTION OF THE PREFERRED EMBODIMENTS:

Referring to FIG. 1 of the drawings, the interior of a vehicle body is generally indicated by 10 and includes a seat 12 with a cushion 14 and back 16. Access to seat 12 is by way of a side door opening selectively opened and closed by a side door 18 in a conventional manner. When an occupant 20 assumes a seated position on seat 12, a belt arrangement according to this invention and generally indicated by 22 is utilized to restrain the occupant in this position.

Figure 2:
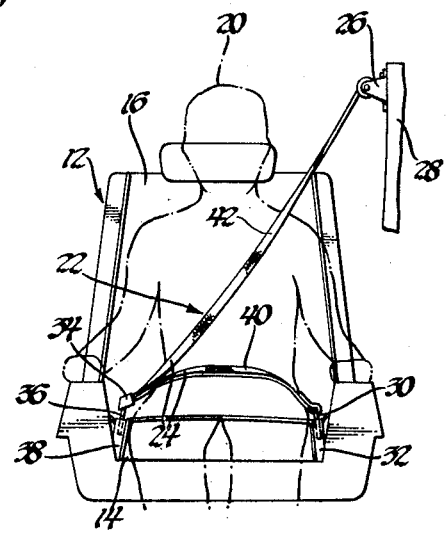
FIG. 2 is a view of the belt arrangement as in FIG. 1 but taken in a direction looking rearwardly from a position forward of the seated occupant.

The belt arrangement includes a single length of belt 24 with one end received by an inertia responsive retractor 26 suitably mounted on the vehicle body center pillar 28. This retractor may also be mounted on the outboard roof structure of the vehicle body or may be mounted on the upper outboard portion of the back 16 of seat 12. The other end of belt 24 attaches a first D-ring 30 which is shown secured by a first buckle 32 mounted adjacent the outboard side of seat cushion 14. This buckle includes a suitable release button, not shown, for selectively releasing D-ring 30 from buckle 32 in a conventional manner. An intermediate portion of belt 24 is slidably received by an adjustable attachment housing 34 which includes a second D-ring 36. D-ring 36 is shown attached to a second buckle 38 mounted adjacent the inboard side of seat cushion 14. This buckle also includes a suitable release button, not shown, for selectively releasing D-ring 36. As shown in FIGS. 1 and 2, the belt 24 thus defines a lap belt portion 40 between the two buckles and a shoulder belt portion 42 between buckle 38 and retractor 26. These belt portions cooperatively restrain the occupant 20 in the seated position shown, while retractor 26 will allow extension of the shoulder belt portion at a controlled rate and forward movement of the occupant's upper torso portion for access to vehicle controls. The housing 34 includes a suitable knurled rod over which belt 24 passes to allow adjustment of the length of lap belt portion 40 in a well known manner. The belt arrangement may be moved from the restraining position of FIGS. 1 and 2 by detaching D-ring 36 from buckle 38 and allowing retractor 26 to retract shoulder belt portion 42. This retraction positions the belt arrangement in a storage position where the belt 24 extends generally rectilinearly between retractor 26 and buckle 32 with housing 34 located intermediate these extremes. When the belt arrangement is in this storage position, an occupant is thus free to leave seat 12. A seated occupant moves the housing 34 inboard from this storage position and consequently extends the shoulder belt portion from the retractor to allow attachment of D-ring 36 to buckle 38 such that the lap and shoulder belt portions are concomitantly positioned in occupant restraining positions.

Figure 3:
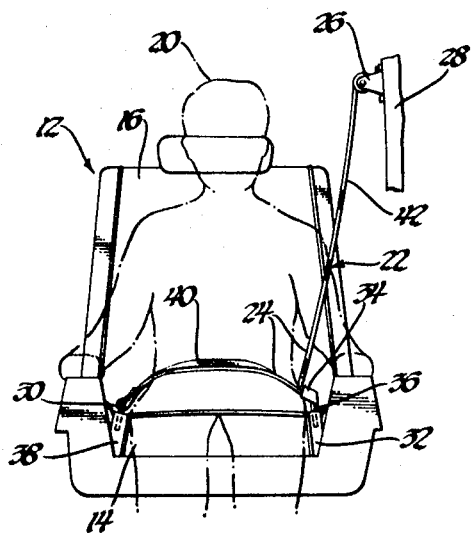
FIG. 3 is a view taken in the same direction as FIG. 2 but showing the belt arrangement being used only as a lap belt.

The belt arrangement 22 may also be used as only a lap belt, as shown by FIG. 3, by attaching the D-rings to the buckles in an opposite manner to their attachment when used as a combination lap and shoulder belt. With D-ring 30 attached to buckle 38 and D-ring 36 attached to buckle 30, the lap belt portion 40 extends across the occupant's lap to restrain the lower torso portion and the shoulder belt portion 42 extends from housing 34 to retractor 26 in a position generally outboard of the position assumed by the occupant. Consequently, the occupant is free of the shoulder belt portion when the belt arrangement is used in this mode, and is free from the lap belt portion upon detachment of D-ring 30 from buckle 38.

Figure 4:
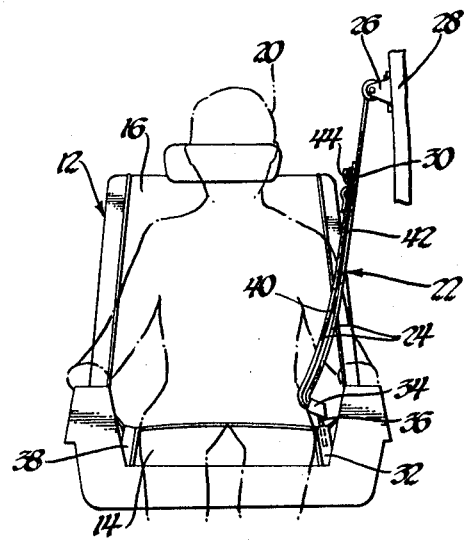
FIG. 4 is a view similar to FIG. 3 which shows the free end of the lap belt hooked to a portion of the shoulder belt to provide a storage position of the belt arrangement.

As shown by the embodiment of FIG. 4, it is also possible to provide a suitable clip or attachment 44 on the shoulder belt portion 42 for attaching the D-ring 30 such that the belt arrangement assumes the storage position shown with D-ring 36 still secured to buckle 32. The D-ring 30 is thus merely detached from the shoulder belt portion and secured to buckle 38 to move the belt arrangement from the FIG. 4 storage position to the position of FIG. 3 for use as a lap belt. It is also possible to provide the buckles 32 and 38 with suitable switches interposed in a circuit associated with the vehicle ignition system. This circuit may include an alarm device which provides a suitable audio or visual signal when the vehicle is placed in a predetermined operative condition without both of the buckles securing respective D-rings to thus indicate the belt arrangement is not being utilized. It is also possible for this circuit to prevent ignition and starting of the vehicle engine unless these switches indicate the belt arrangement is being utilized.

The invention thus provides an improved belt arrangement.

What is claimed is:

1. A belt arrangement for restraining an occupant of a vehicle body on an associated seat including a seat cushion and seat back, the belt arrangement comprising, a belt, a belt retractor mounted adjacent the upper end of the seat back adjacent one side of the seat and receiving one end of the belt, first belt attachment means on the other end of the belt, second belt attachment means adjustably positioned on an intermediate portion of the belt, a first vehicle body attachment means adjacent the seat cushion at the one side of the seat and adaptable to attach either of the belt attachment means, and a second vehicle body attachment means adjacent the seat cushion at the other side of the seat and adaptable to attach either of the belt attachment means, the first and second belt attachment means being respectively attachable to the first and second vehicle body attachment means to allow use of the belt as a combination lap and shoulder belt and being attachable to these vehicle body attachment means in an opposite manner to allow use of the belt only as a lap belt.

2. A belt arrangement for restraining an occupant of a vehicle body on an associated seat including a seat cushion and seat back, the belt arrangement comprising, a belt, a belt retractor mounted adjacent the upper end of the seat back adjacent one side of the seat and receiving one end of the belt, a first D-ring secured to the other end of the belt, means adjustably positioned on an intermediate portion of the belt and including a second D-ring, a first buckle secured adjacent the seat cushion at the one side of the seat and adaptable to releasably secure either of the D-rings, and a second buckle secured adjacent the seat cushion at the other side of the seat and adaptable to releasably secure either of the D-rings, the first and second D-rings being respectively secured to the first and second buckles to allow use of the belt as a combination lap and shoulder belt and being attachable to these buckles in an opposite manner to allow use of the belt only as a lap belt.

3. A belt arrangement for restraining an occupant of a vehicle body on an associated seat including a seat cushion and seat back, the belt arrangement comprising, a belt, an inertia responsive belt retractor mounted adjacent the upper end of the seat back adjacent one side of the seat and receiving one end of the belt, a first D-ring secured to the other end of the belt, means adjustably positioned on an intermediate portion of the belt and including a second D-ring, a first buckle secured adjacent the seat cushion at the one side of the seat and adaptable to releasably secure either of the D-rings, and a second buckle secured adjacent the seat cushion at the other side of the seat and adaptable to releasably secure either of the D-rings, the first and second D-rings being respectively secured to the first and second buckles to allow use of the belt as a combination lap and shoulder belt whose shoulder belt portion allows controlled forward movement of the occupant's upper torso portion for access to vehicle controls and the D-rings being secured to the buckles in an opposite manner to allow use of the belt only as a lap belt.

4. The belt arrangement of claim 3 which includes attachment means on the belt intermediate the retractor and second D-ring and adaptable to attach the first D-ring with the second D-ring secured to the first buckle such that the belt arrangement is maintained in a storage position.

* * * * *